Figure 1:
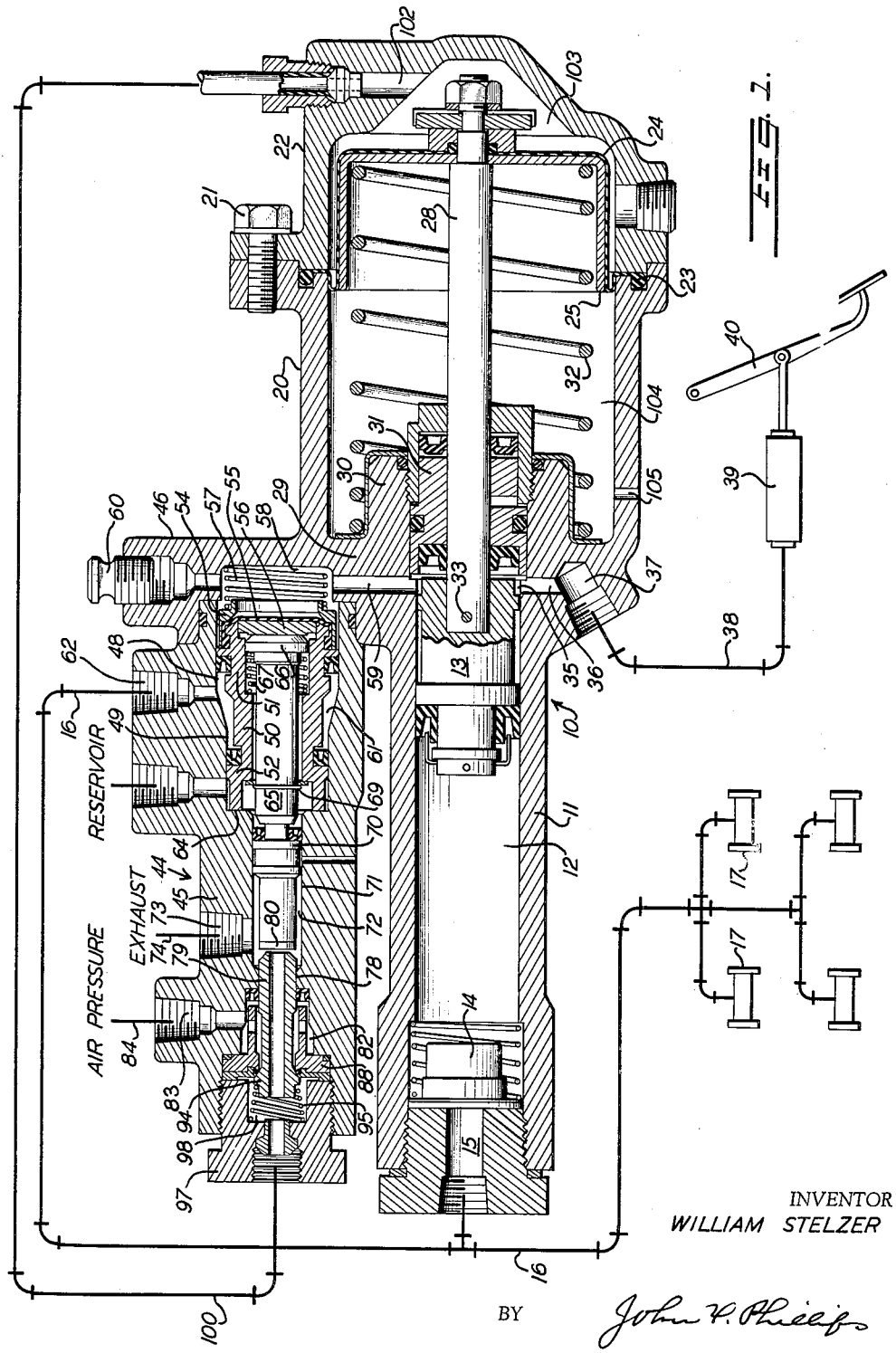

March 28, 1961 W. STELZER 2,976,686
BOOSTER BRAKE MECHANISM
Filed Feb. 7, 1958 2 Sheets-Sheet 1

INVENTOR
WILLIAM STELZER
BY John P. Phillips
ATTORNEY

March 28, 1961 W. STELZER 2,976,686
BOOSTER BRAKE MECHANISM
Filed Feb. 7, 1958 2 Sheets-Sheet 2

INVENTOR
WILLIAM STELZER

ATTORNEY

United States Patent Office 2,976,686
Patented Mar. 28, 1961

2,976,686

BOOSTER BRAKE MECHANISM

William Stelzer, Bloomfield Hills, Mich., assignor to Kelsey-Hayes Company, Detroit, Mich., a corporation of Delaware Filed Feb. 7, 1958, Ser. No. 713,981

10 Claims. (Cl. 60—54.6)

This invention relates to a booster brake mechanism, and it has particular reference to the type of such mechanism employing a booster motor controlled by a valve mechanism operated by fluid displaced from a pedal-operated master cylinder.

In booster mechanisms of the type referred to, a valve operating mechanism in the form of a piston movable by fluid displaced from a pedal-operable master cylinder is employed. Such valve operating piston is movable in a cylinder, and deformable seals are employed between the valve operating pistons and cylinders to seal against fluid leakage. Such mechanism have been fully operative and possess definite advantages. However, they possess one disadvantage in that in the initial operation of the mechanism upon depression of the brake pedal, a valve operating piston must be moved against the friction of the deformable sealing elements referred to. Thus it is difficult in a device of this character to adequately fluid-seal the valve operating piston and at the same time provide the mechanism with the highly desirable "soft" pedal.

An important object of the present invention is to provide a booster mechanism of the type referred to wherein the control valve mechanism for the booster motor is operated wholly in the absence of any sealing cup friction, thus providing the mechanism with a "soft" initial pedal.

A further object is to provide such a mechanism wherein initial operation of the valve mechanism to activate the motor is provided through the displacement of a diaphragm by fluid displaced from the pedal-operated master cylinder, thus providing for the initial operation of the motor without the operator's having to overcome appreciable friction in the movement of the valve mechanism.

A further object is to provide such a device wherein direct hydraulic reactions are transmitted to the master cylinder in the initial stages of brake operation and wherein a secondary reaction comes into play upon engagement of the brake shoes with the brake drums, thus providing a mechanism which has a "soft" initial brake action followed by a higher degree of hydraulic reaction in later stages of brake operation.

A further object is to provide a mechanism of this character wherein the displaceable diaphragm which initially operates the valve mechanism is carried by a sealed piston which moves only in the stage of secondary reaction for providing such reaction, and wherein excessive deformation of the valve operating diaphragm is prevented by providing mechanical means for limiting movement of the diaphragm relative to the secondary reaction piston.

Other objects and advantages of the invention will become apparent during the course of the following description.

Figure 2:
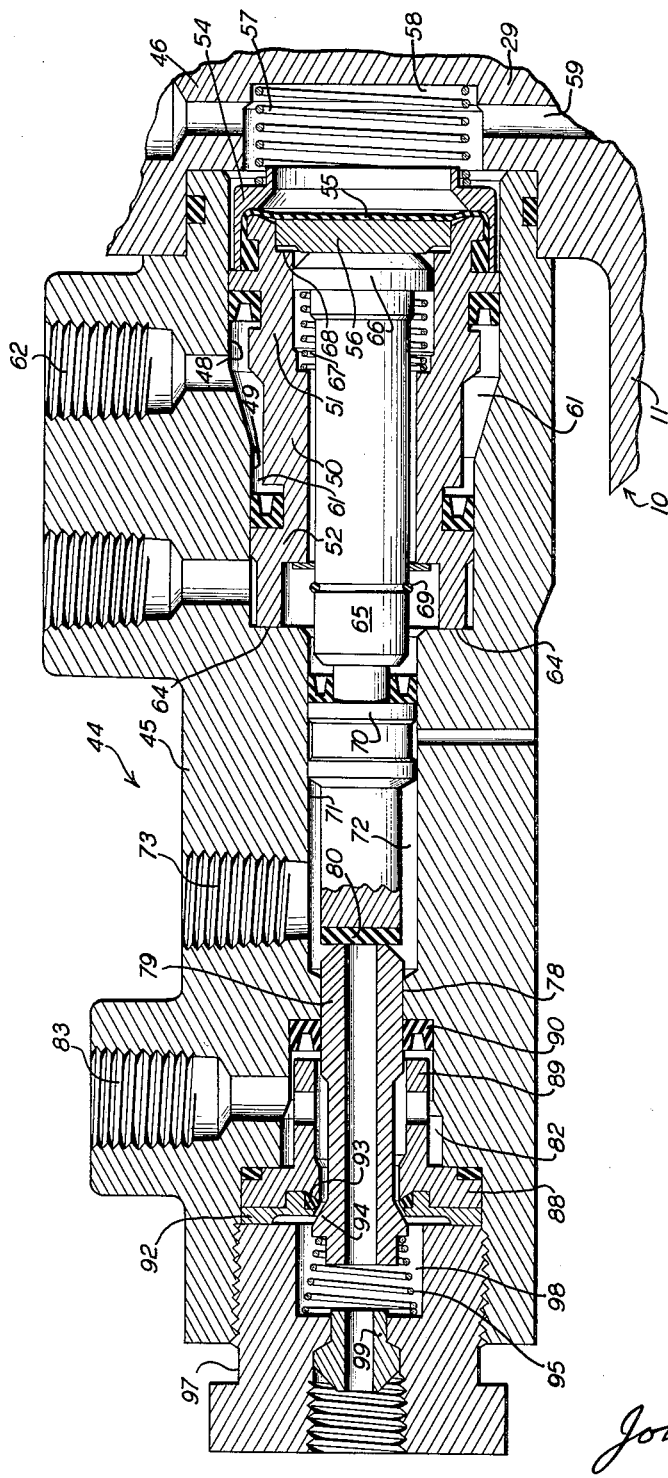

In the drawings I have shown one embodiment of the invention. In this showing:

Figure 1 is a longitudinal sectional view through the booster mechanism, associated parts of the system being diagrammatically shown, all of the parts being illustrated in their normal off positions; and Figure 2 is an enlarged longitudinal sectional view through the valve mechanism and the operating and reaction means, the parts being shown in partially brake applied positions.

Referring to Figure 1, the numeral 10 designates as a whole the preferably die-cast body of the device, one end 11 of which constitutes a power-operated master cylinder having a chamber 12 therein. A plunger 13 is operable in the manner to be described to displace fluid past a conventional residual pressure valve 14 through a passage 15 into lines 16 leading to conventional brake cylinders 17.

The other end of the body 10 is formed as a motor housing 20 secured as at 21 to a cap 22 forming a second portion of the motor housing. The motor housing members 20 and 22 clamp therebetween a peripheral bead 23 formed on a diaphragm 24 of the rolling type, the diaphragm fitting around a cup 25 as shown in Figure 1.

A shaft 28 is fixed at one end to the cup member 25 and diaphragm 24. At the left-hand end of the motor housing 20 is formed a wall 29 having a hub 30 in which is arranged suitable bearing and sealing means 31 through which the shaft 28 extends. A return spring 32 biases to normal off position shown in Figure 1 the pressure responsive unit of the motor comprising the cup member 25 and diaphragm 24. In the right-hand end of the power operated master cylinder 11, the shaft 28 is secured to the plunger 13 as at 33.

Back of the plunger 13 is formed a chamber 35 communicating through a passage 36 with a port 37. This port is connected to one end of a line 38 leading to a conventional master cylinder 39 operable by a pedal 40.

A valve mechanism for controlling the motor is indicated as a whole by the numeral 44 and comprises an axially elongated housing 45 connected in any suitable manner with an upstanding portion 46 forming a continuation of the motor wall 29. Adjacent one end, the valve housing 45 is provided with a bore 48 communicating to the left thereof with a smaller bore 49. A plunger 50 is provided with a larger end 51 slidable in the bore 48 and a smaller end 52 slidable in the smaller bore 49.

A retaining member 54 fixes in position on the extremity of the larger end 51 of the plunger 50 the peripheral portion of a diaphragm 55 backed up by a disk 56. The retaining member 54 acts as a seat for one end of a compression spring 57, the other end of which seats against the wall 46. Within such wall is formed a chamber 58 communicating through a passage 59 with the chamber 35 back of the plunger 13. A bleed plug 60 is provided for the chamber 58.

The space between the bores 48 and 49 forms a chamber 61 communicating through a port 62 with an extension of the hydraulic line 16. Thus it will be apparent that any fluid pressure built up through the line 16 in the brake cylinders 17 will be duplicated in the chamber 61.

It will be noted that the spring 57 seats the smaller end 52 of the piston 50 against a shoulder 64 formed in the housing 45, the piston 50 thus normally occupying the position shown in Figure 1. Within the piston 50 is arranged an operating plunger rod 65 provided at its right-hand end with a head 66 engaging the disk 56. The plunger rod 65 is biased to the normal position shown in Figure 1 by a spring 67. Referring to Figure 2, it will be noted that the disk 56 is slidable in the adjacent end of the piston 50 and that its inward movement is limited by a shoulder 68. Movement of the plunger rod to off position is limited by a snap ring 69. The left-hand end of the plunger rod 65 is provided with an enlarged portion 70 arranged in sliding sealed engagement with a bore 71, the portion of the plunger rod 65 to the left of the head 70 being smaller than the bore 71 to provide an exhaust chamber 72. This chamber communicates through a port 73 directly with the atmosphere, or to the atmosphere through an exhaust line 74.

To the left of the plunger rod 65 and coaxial therewith, the housing 45 is provided with a bore 78 in which is slidable a tubular valve member 79. The left-hand extremity of the rod 65 is provided with a valve element 80, preferably resilient, engageable with the adjacent end of the tubular member 79 to close the passage therethrough from communication with the exhaust chamber 72. To the left of the bore 78, a chamber 82 is formed in the housing 45, and this chamber communicates with a port 83 connected to a line 84 (Figure 1) leading to a source of super-atmospheric pressure.

A retaining member 88 (Figure 2) is arranged in the left-hand end of the body 45 and is provided with an apertured axial extension 89 tending to prevent any substantial displacement of a seal 90 which prevents leakage of air through the bore 78. The member 89 is used purely as a matter of expediency and forms no part of the present invention. A cooperating retainer 92 is arranged against the retainer 88, and these two members clamp therebetween a resilient valve 93 normally engaged by a poppet valve 94 formed on the tubular member 79. The valve 94 is biased to closed position by a spring 95.

A plug 97 is threaded in the left-hand end of the body 45 and has formed therein a chamber 98 communicating with the interior of the tubular member 79 and with a fitting 99 by which the plug 97 is connected to one end of an air pressure line 100 (Figure 1). The other end of this pressure line is connected to the motor housing portion 22 and communicates through a passage 102 with the variable pressure chamber 103 of the motor. The pressure responsive unit of the motor divides this chamber from an atmospheric chamber 104, formed in the motor housing member 20 and preferably vented to the atmosphere as at 105.

*Operation*

The parts normally occupy the positions shown in Figure 1. The right-hand end of the tubular valve member 79 is open to the exhaust chamber 72, hence atmospheric pressure will exist in the line 100 and in the motor chamber 103. Operation of the device is effected by depressing the brake pedal to displace fluid from the master cylinder 39 through port 37. The hydraulic fluid flows through passage 36, chamber 35 and passage 59 into the chamber 58, and fluid in the latter chamber will displace the diaphragm 55 to the left of the position shown in Figure 1 to close the valve 80. This brings the valve parts to lap position, and slight further movement of the plunger rod 65 will effect movement of the tubular member 79 to unseat the valve 94. Super-atmospheric pressure will then flow through line 84 and port 83 into the chamber 82, thence around the valve 94 and on into the line 100 and into the motor chamber 103. The valve parts under such conditions will assume the approximate positions shown in Figure 2.

Initial operation referred to takes place without appreciable frictional resistance to movement, as further referred to below. The first stage of motor activation is accomplished solely by the diaphragm 55 against, initially, the resistance of the spring 67 and then the spring 95, both of these springs being light. Since the disk 56 is freely movable without seals, due to the sealing effect of the diaphragm 55, this diaphragm may be displaced with little pedal pressure to initially activate the motor. Thus a soft initial pedal is provided.

The admission of super-atmospheric pressure into the motor chamber 103 moves the pressure responsive unit of the motor toward the left in Figure 1 and transmits movement to the plunger 13 to displace fluid from the chamber 12 into the brake lines 16 and thus into the wheel cylinders 17 and into the chamber 61 to which the hydraulic line 16 also leads.

As pressure is built up in the wheel cylinders it will be built up also in the chamber 61, and due to the difference in the diameters of the piston portions 51 and 52, pressure in the chamber 61 will tend to urge the piston 50 toward the right of the normal position shown in Figure 1. The spring 57 forms a transition spring to control the transition of operation into later brake stages, the spring 57 being loaded so that its pressure will be overcome at the proper point. This is the point at which initial brake engagement takes place, at which time there will be a rapid increase in pressure in the chamber 12, lines 16, brake cylinders 17 and chamber 61. At the point of transition referred to, therefore, pressure in the chamber 61 will be sufficient to overcome the loading of the spring 57, whereupon the piston 50 will be moved to the right of the position shown in Figure 1.

It will be noted in Figure 2 that during initial booster operation, after motor energization has started and before the transition point is reached, the disk 56 will be slightly spaced from the shoulder 68. When pressure in the chamber 61 increases to the point necessary for overcoming the spring 57, the piston 50 will move toward the right of the position shown in Figure 2 to close the gap between the disk 56 and shoulder 68. No further distortion of the diaphragm 55 thereafter will be possible, the diaphragm being solidly backed up by the disk 56 which, in turn, is backed up solidly by the shoulder 68. Thus the diaphragm provides for relatively frictionless operation of the valve mechanism during the first stage of brake application, but the diaphragm cannot be excessively distorted by the substantial pressures which will be present in the chamber 58 during later stages of brake operation.

The master cylinder 39 is operated to effect operation of the valve mechanism in the manner stated, and fluid displaced into the chamber 35 will act against the right-hand side of the plunger 13, thus assisting the motor in generating the hydraulic pressure for applying the brakes. No matter how much pressure is generated by the operator, for example, the relatively high pressure occurring in a panic stop, the diaphragm 55 cannot be subjected to any distorting or damaging pressures.

When the brake pedal is released, there will be an immediate pressure drop in the line 38 and chambers 35 and 58, and the drop in pressure in the latter chamber permits the spring 67 to return the head 66 and associated parts to their normal positions shown in Figure 1. The valve 80 will be opened, and the spring 95 will return the valve tube 79 to the normal position shown in Figure 1, thus exhausting the motor chamber 103 to the atmosphere. The return spring 32 of the motor will return the pressure responsive unit to its normal position.

From the foregoing, it will be apparent that the present construction provides novel means for effecting operation of a booster motor valve mechanism during initial stages of brake pedal operation in which movement of the parts is effected by the operator in depressing the brake pedal. This is accomplished by eliminating the friction of sealing cups, thus providing for a highly desirable initial "soft" pedal. Moreover, the diaphragm may be relatively large, thus providing a pressure area of such size that very little pedal pressure is necessary to effect movement of the valve mechanism. The only seals which introduce any resistance to manual operation of the parts are the very small seals which surround the plunger rod 65 adjacent the head 70, and around the valve tube 79. Since these seals are small and the area of the diaphragm 55 is substantial, the very "soft" characteristic of initial pedal operation is preserved.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism comprising a hydraulic pressure chamber, a plunger movable thereinto to displace fluid therefrom, a fluid pressure motor having a pressure responsive unit connected to said plunger and at one side of which is a variable pressure chamber, a valve mechanism connected between said variable pressure chamber and sources of different pressures and normally connecting said variable pressure chamber to one of said sources, a control chamber, a pedal operable master cylinder connected to said control chamber, a diaphragm open to pressure in said control chamber, valve operating means connected between said diaphragm and said valve mechanism to operate the latter by fluid displaced into said control chamber from said pedal operable master cylinder, such means including a backing element engaging said diaphragm, and an axially movable reaction plunger extending into said control chamber and having a pressure surface exposed to pressures equal to pressures in said hydraulic pressure chamber to react against pressure in said control chamber, said valve operating means projecting axially through said plunger and being axially movable relative thereto, said backing element and said reaction plunger having lost motion connection which is taken up by movement of said reaction plunger when pressures in said hydraulic pressure chamber increase to a predetermined point.

2. A mechanism according to claim 1 wherein said diaphragm has its peripheral portion fixed to said reaction plunger, said backing element being a disk slidable in said reaction plunger.

3. A mechanism according to claim 1 provided with a housing having coaxial bores of different diameters, said reaction plunger having end portions of different diameters slidable in said bores, said housing being provided between said bores with a reaction chamber communicating with said hydraulic pressure chamber.

4. A booster brake mechanism comprising a hydraulic pressure chamber, a plunger movable thereinto to displace fluid therefrom, a fluid pressure motor having a pressure responsive unit connected to said plunger and at one side of which is a variable pressure chamber, a valve mechanism connected between said variable pressure chamber and sources of different pressures and normally connecting said variable pressure chamber to one of said sources, a housing, a control chamber in said housing, a pedal operable master cylinder connected to said control chamber, said housing being provided with a pair of bores of different diameters, a reaction plunger having ends of different diameters slidable in said bores, a diaphragm carried by said reaction plunger and exposed to pressure in said control chamber, the radially outer portion of one end of said reaction plunger being exposed to said control chamber, means comprising a rod projecting axially through said plunger and connected between said diaphragm and said valve mechanism to operate the latter by fluid displaced into said control chamber, such means further comprising a rigid backing element connected to said rod and engaging said diaphragm and having lost motion connection with said reaction plunger, and means biasing said reaction plunger away from said control chamber, said housing having a reaction chamber between said ends of said reaction plunger communicating with said hydraulic pressure chamber to be subject to pressures therefrom to overcome said biasing means when such pressures increase to a predetermined point.

5. A mechanism according to claim 4 wherein said backing element comprises a disk recessed into the end of said reaction plunger adjacent said control plunger, said reaction plunger having a shoulder normally spaced from said disk and forming said lost motion connection.

6. A booster brake mechanism comprising a cylinder, a plunger movable therein and dividing said cylinder to form a pair of chambers, one of which is a hydraulic pressure chamber, a fluid pressure motor having a pressure responsive unit connected to said plunger to move it to displace fluid from said hydraulic pressure chamber, said motor having a variable pressure chamber at one side of said pressure responsive unit, a valve mechanism connected between said variable pressure chamber and sources of different pressures, a control chamber, a pedal operable master cylinder connected to said control chamber and to the other chamber of said pair, a diaphragm open to pressure in said control chamber, valve operating means connected between said diaphragm and said valve mechanism to operate the latter by fluid displaced into said control chamber from said master cylinder, such means including a disk engaging said diaphragm, and a reaction plunger to one end of which the periphery of said diaphragm is secured, said end of said plunger being exposed to pressure in said control chamber and having a pressure surface exposed to pressures equal to pressures in said hydraulic pressure chamber to react against pressure in said control chamber, said valve operating means further comprising a member projecting through and movable axially of said plunger, said disk and said reaction plunger having lost motion connection which is taken up by movement of said reaction plunger when pressures in said hydraulic pressure chamber increase to a predetermined point.

7. A booster brake mechanism comprising a cylinder, a plunger movable therein and dividing said cylinder to form a pair of chambers, one of which is a hydraulic pressure chamber, a fluid pressure motor having a pressure responsive unit connected to said plunger to move it to displace fluid from said hydraulic pressure chamber, said motor having a variable pressure chamber at one side of said pressure responsive unit, a valve mechanism connected between said variable pressure chamber and sources of different pressures, a housing, a control chamber in said housing, a pedal operable master cylinder connected to said control chamber and to the other chamber of said pair, said housing being provided with a pair of bores of different diameters, a reaction plunger having ends of different diameters slidable in said bores, the larger end of said reaction plunger being at the end thereof adjacent said control chamber, said housing between said bores having a reaction chamber connected to said hydraulic pressure chamber, a diaphragm fixed at its periphery to said larger end of said reaction plunger and exposed to pressure in said control chamber, means projecting through and movable axially relative to said plunger and connected between the radially inner portion of said diaphragm and said valve mechanism to operate the latter by fluid displaced into said control chamber, such means comprising a rigid disk engaging said diaphragm and having lost motion connection with said reaction plunger, and means biasing said reaction plunger away from said control chamber.

8. A mechanism according to claim 7 wherein said means connected between said diaphragm and said valve housing further comprises an operating rod axially slidable in said reaction plunger and having one end engaging said disk, and means biasing said rod, said disk and said diaphragm toward said control chamber to a normal off position.

9. A booster brake mechanism comprising a hydraulic pressure chamber, a plunger movable thereinto to displace fluid therefrom, a fluid pressure motor having a pressure responsve unit connected to said plunger and at one side of which is a variable pressure chamber, a valve mechanism between said variable pressure chamber and sources of different pressures and normally connecting said variable pressure chamber to one of said sources, a casing having a control chamber therein, pedal operable means for supplying hydraulic fluid to said control chamber, an axially movable reaction plunger in said casing having an axial opening therethrough, a diaphragm spanning one end of said reaction plunger and exposed to pressure in said control chamber, an axially movable valve operating stem projecting through said opening in said reaction plunger and having one end mechanically engageable with said diaphragm to be operated thereby upon movement thereof by pressure in said control chamber and having its other end operatively connected to said valve mechanism, said casing having a reaction chamber to which are exposed surfaces of said plunger facing away from said control chamber, means biasing said reaction plunger away from said control chamber, and a fluid connection between said hydraulic pressure chamber and said reaction chamber.

10. A mechanism according to claim 9 provided with means engaging said diaphragm and engageable with said reaction plunger for limiting movement of said diaphragm relative to said reaction plunger away from said control chamber.

References Cited in the file of this patent

UNITED STATES PATENTS

| | | |
|---|---|---|
| 2,260,490 | Stelzer | Oct. 28, 1941 |
| 2,475,313 | Davis | July 5, 1949 |
| 2,548,496 | Rockwell | Apr. 10, 1951 |
| 2,638,747 | Rockwell | May 19, 1953 |
| 2,797,665 | Chouings | July 2, 1957 |
| 2,866,318 | Ingres | Dec. 30, 1958 |

FOREIGN PATENTS

| | | |
|---|---|---|
| 1,115,937 | France | Jan. 23, 1956 |
| 689,334 | Great Britain | Mar. 25, 1953 |